Nov. 2, 1926.
J. BLUE
1,605,502
FERTILIZER DISTRIBUTOR
Original Filed Nov. 24, 1920
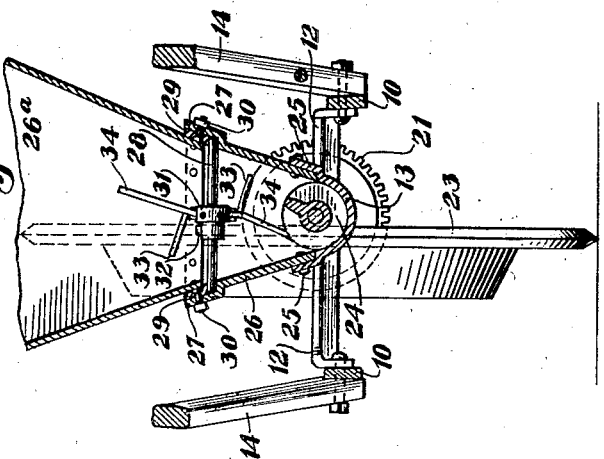
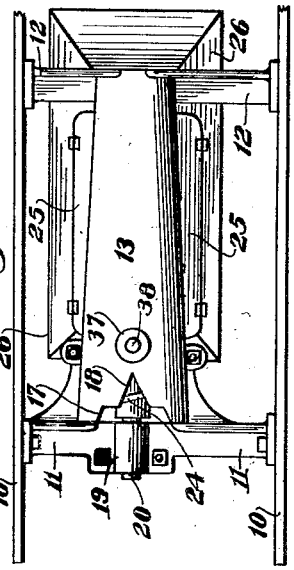
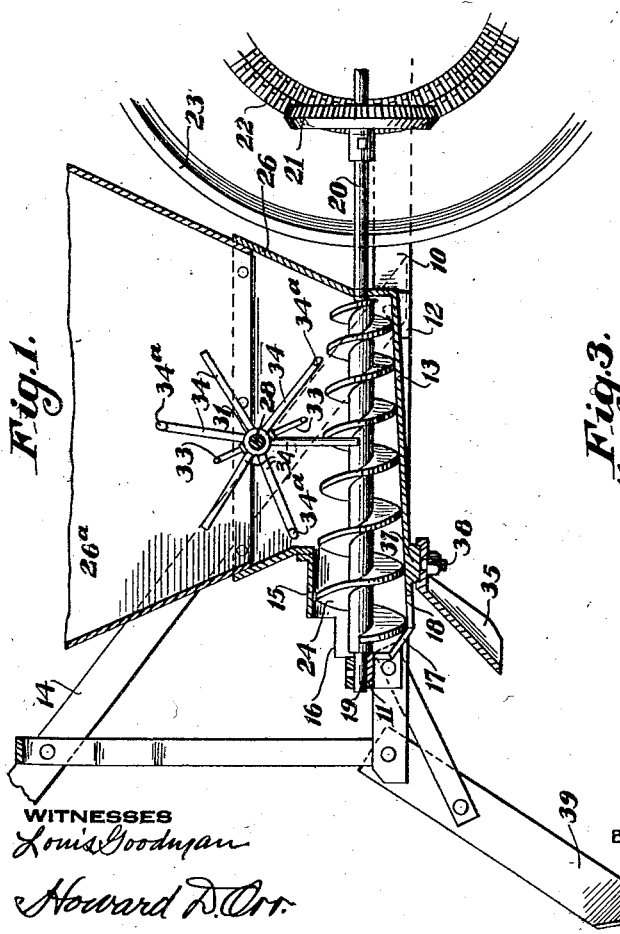
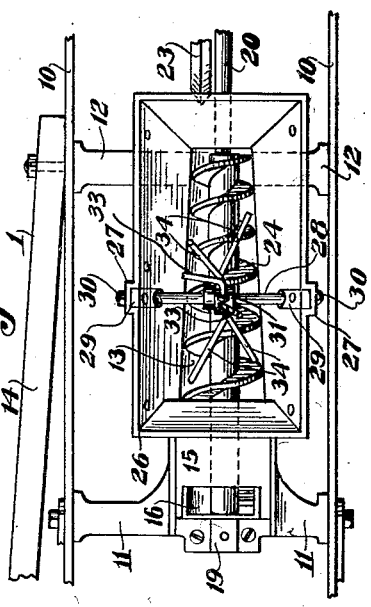
John Blue
INVENTOR Patented Nov. 2, 1926.

1,605,502

UNITED STATES PATENT OFFICE.

JOHN BLUE, OF LAURINBURG, NORTH CAROLINA.

FERTILIZER DISTRIBUTOR.

Original application filed November 24, 1920, Serial No. 426,192. Divided and this application filed April 17, 1924. Serial No. 707,208.

This invention relates to fertilizer distributors, and the present application is a division of an application filed by me on November 24, 1920, for a patent on a fertilizer distributor and bearing Serial Number 426,192.

The subject matter of the present application covers an improved hopper for use in connection with fertilizer distributors, whereby agitating or stirring means as well as conveying or feeding means of improved construction may be readily incorporated therein; and also to provide a hopper which, when the metal sides thereof have been corroded or otherwise impaired by the action of the acid in the fertilizers to the point of uselessness, may be readily replaced at a relatively small cost.

Another object is to provide a worm feed for the hopper for conveying the fertilizer to the point of discharge which will cause a uniform feed of the same, and which, by its peculiar construction, will prevent clogging of the fertilizer between the convolutions of said worm, the latter being designed to co-act with and to actuate agitating means for stirring the fertilizer within the hopper.

A further object is to provide improved agitating or stirring means which is continuously revolved by contact with the convolutions of the feed worm, and which acts to stir up the contents of the hopper and thus prevent clogging of the same.

A final object is to provide a scattering means located beneath the discharge opening of the hopper at one end of the worm feed, said scatterer being shaped to spread the falling fertilizer transversely of the line of travel of the machine to insure uniform covering, and being also adjustable so that the fertilizer may be directed more to one side of the row than the other, in advance of the covering blades.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a vertical, longitudinal section through a hopper constructed in accordance with the invention and showing the agitating, feeding and scattering means applied thereto.

Figure 2 is a vertical, transverse sectional view of the same.

Figure 3 is a top plan view thereof.

Figure 4 is a bottom plan view.

In the drawing there is illustrated a pair of spaced beams 10 comprising part of the frame of a fertilizer distributor, such as is shown and described in the aforesaid application, and since the specific form of construction and the particular parts of said machine are not essential to the present invention, no attempt has been made herein to show a complete working machine.

The side beams 10 are connected, intermediate their ends, by spaced cross arms 11 and 12 formed integrally with a centrally located, longitudinally-disposed hopper bottom 13, the said hopper bottom and arms being preferably in the form of a metal casting which will not be readily affected by the action of the acids in the fertilizer contained in the hopper. The arms are bolted or otherwise secured to the beams 10, and the bolts fastening the front arms 12 also serve to secure operating handles 14 to the outside of said beams, said handles being inclined upwardly and rearwardly, in the usual manner, to be grasped by the operator for directing and controlling the machine, which may be of the horse-drawn type, or otherwise.

The hopper bottom 13, which is substantially semi-circular in cross section, as shown in Figure 2 of the drawing, tapers toward the front end where joined to the arms 12, and the bottom wall thereof thus gradually falls toward the rear or discharge end, as shown in Figure 1. The rear end of the hopper bottom is provided with a tubular extension 15, having a portion of its rear end cut away at the top to provide an observation opening 16, by means of which the operator walking behind the machine, and guiding and operating the same, may watch the action of the feeding means within the hopper bottom, as will be described. The hopper bottom is further provided with an outlet opening 17 in its bottom wall and at the rear end of the same, through which the fertilizer is adapted to fall while being fed rearwardly, said opening 17 having a V-shaped extension 18 directed toward the front of the machine, so that as the fertilizer reaches the apex of the V-shaped extension, while being forced along by the worm, a uniform feed will be obtained along the diverging sides of the V-shaped extension, instead of all abruptly dropping as when an ordinary transverse opening is used.

At a point concentric with the tubular extension 15, the rear cross arms 11 are provided with a longitudinally disposed bearing 19, which is adapted to receive the rear end of a revolving worm shaft 20, which extends through the said extension 15 and the bottom 13 and on towards the front of the machine, where it may have suitable bearing in any desired manner, and where the same is provided with a beveled gear wheel 21, in meshing relation to a crown gear 22, mounted on a transverse shaft having a drive or bull wheel 23, secured to the same and adapted to bear the weight of the machine and to drive the said shaft 20.

Keyed or otherwise secured to the shaft 20 is a feed worm or conveyor 24 having its spaced convolutions gradually increasing in diameter toward the rear end, where fitting within the tubular extension 15, and having the spaces between said convolutions gradually increasing toward the rear end, as clearly shown in Figure 1 of the drawing.

The upper edges of the longitudinal sides of the hopper bottom 13 are provided with offset flanges 25 for receiving between the same the lower portion of a rectangular hopper 26, formed of cast metal and having its end and side walls tapering downwardly and held in engagement with the hopper bottom by bolts or otherwise, the said hopper bottom being closed at its front end and provided with a suitable semi-circular opening to register with a similar opening in the lower edge of the front wall of the tapered hopper 26, for the purpose of permitting the shaft 20 to pass through the same.

Mounted within the upper edges of the cast metal hopper 26 is a supplemental hopper 26ª formed of suitable sheet metal, such as galvanized sheet iron, the same being rectangular in horizontal cross section, and having tapering front and rear and side walls to conform to the shape of the said cast metal bottom 26, and held to the latter by suitable bolts or otherwise. This sheet metal extension or supplemental hopper is designed to reduce the weight of the machine and to enable replacement at a relatively low cost, when the hopper is materially affected by the acids contained in the fertilizer.

The side walls of the hopper 26 are provided at their top edges with integrally formed boxes 27, open at their tops and adapted to receive the ends of a stirrer shaft 28, which may freely rotate in the bearings thus provided. Blocks 29 having their lower ends curved to conform to the shaft, are held in the upper portions of the boxes by bolts 30, and thus hold said shaft in place. The stirrer shaft 28 is arranged transversely of the hopper and at a point somewhat in rear of the center of the same, as shown in Figure 1 of the drawing.

Directly over the feed shaft 20, the stirrer shaft carries a hub 31 secured thereto as by a set screw 32, and said hub is provided with a series of radial arms 33 and 34 arranged in three sets and constituting stirring arms. The arms 33 extend in lines nearly parallel to the shaft 28, these arms being designed to exert a lifting action upon the fertilizer. The arms 33, as shown, are much shorter than the arms 34, and the latter arms 34 engage with the worm whereby the stirrer is rotated. The arms 34 extend alternately in directions to the left and to the right of the hub 31 on opposite sides of the axis of the worm. Every other arm 34 has a bevelled end 34ª to facilitate the engagement of the said arm with the helical surface of the convolutions of the worm 24, which, being made of cast metal, may have small imperfections in its surface which would tend to bend or break the arms were the bevelled surfaces not provided. Only the arms 34 which extend to the left of the hub 31, as when looking toward the front of the machine, are provided with the bevelled ends where they engage the rising side of the revolving worm, and those extending to the right may be cut off square as they engage the helical surface of the worm convolutions on the falling side thereof.

As the fertilizer falls through the opening 17 and the V-shaped extension 18, it falls upon an arcuately curved deflector plate or scatterer, which inclines rearwardly and downwardly, as shown in Figure 1, said plate having at its upper end a horizontally disposed, circular socket 36 adapted to fit around a depending, round lug 37 formed on the under side of the hopper bottom 13 adjacent to the V-shaped opening 18, and held in position thereon by a bolt 38, which may be loosened to permit the deflector plate to be swung to one side or the other, and then tightened to hold the same in adjustment for throwing the major portion of the fertilizer in the desired direction.

The stirrer insures proper feed of the fertilizer to the screw or worm conveyor, while the latter, because of its increase in size in the direction of its feed, prevents the fertilizer from caking or clogging, and the implement distributes the fertilizer evenly and uniformly at any desired rate of speed depending upon the ratio between the drive gears, and it will be seen that the machine may be easily handled and controlled to supply a steady falling of the fertilizer upon the ground in proper manner to be covered by the covering blades 39.

From the foregoing it will be seen that a simple, cheaply manufactured, strong and durable machine has been provided for distributing fertilizers or similar material, wherein regularity of feed is insured by the tapering worm and the peculiar outlet opening, and that the contents of the hopper is constantly stirred thus preventing caking or clogging thereof, and that the hopper proper may be easily and cheaply renewed when it becomes useless through the action of the acids in the fertilizer.

What is claimed is:

1. In a fertilizer distributor, a hopper having in its longitudinal upper edges a pair of opposite integrally formed boxes provided with an outer wall, side walls, and a bottom wall and open at their tops, said boxes providing a pair of seats, blocks receivable in said seats, means holding each block fast to the hopper within its seat, a shaft or rod having its ends received in the seats and held therein by said blocks, and means on said rod for stirring material in the hopper.

2. In a fertilizer distributor, a hopper having in its longitudinal upper edges a pair of opposite integrally formed boxes provided with an outer wall, side walls, and a bottom wall and open at their tops, said boxes providing a pair of seats, blocks mounted in said seats, means holding each block fast to the hopper within its seat, a shaft or rod having its ends received in the seats and held therein by the said blocks, a supplemental hopper formed of sheet metal and mounted within the upper edges of the hopper on the inside of the blocks and held in position by bolts, and means on said rod for stirring material in the hopper.

3. In a fertilizer distributor, a frame, a hopper having a bottom substantially semi-circular in cross section, spaced cross arms formed integrally with said bottom, means for securing said cross arms to said frame, offset flanges equally inclined at opposite angles at the upper edges of the hopper bottom, and a cast metal hopper fitted to said flanges at its lower edges.

4. In a fertilizer distributor, a hopper, a power driven worm in the bottom of the hopper, and a stirrer turned by said worm, said stirrer including a plurality of separate straight arms arranged in two sets, the arms of one set extending at equal lengths to the left of the longitudinal axis of the worm, the arms of the other set extending at equal lengths to the right, the arms of each of the sets engaging the worm, whereby the stirrer is rotated and the contents of the hopper are thoroughly mixed.

5. In a fertilizer distributor, a hopper, a power-driven worm in the bottom of the hopper, and a stirrer turned by said worm, said stirrer including a plurality of separate straight arms, arranged in three sets, the arms of one set extending at equal lengths to the left of the longitudinal axis of the worm, and having beveled ends, the arms of the second set extending at equal lengths to the right thereof, the arms of each of the specified sets engaging the worm, whereby the stirrer is rotated, the arms of the third set being nearly horizontal and exerting a lifting action on the contents of the hopper to thoroughly mix the same, all the arms being carried by a common hub on the stirrer shaft.

In testimony, that I claim the foregoing as my own, I have hereto affixed my signature.

JOHN BLUE.